US012650905B2

(12) United States Patent
Muthusamy et al.

(10) Patent No.: US 12,650,905 B2
(45) Date of Patent: Jun. 9, 2026

(54) ANOMALOUS TRANSACTION RECOVERY IN DATABASE SYSTEMS

(71) Applicant: Dell Products L.P., Round Rock, TX (US)

(72) Inventors: Yuvaraj Muthusamy, Bangalore (IN);
Dhilip S. Kumar, Bangalore (IN);
Sriram Subramanian, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 18/672,724

(22) Filed: May 23, 2024

(65) Prior Publication Data

US 2025/0363015 A1 Nov. 27, 2025

(51) Int. Cl.
*G06F 16/00* (2019.01)
*G06F 11/1446* (2026.01)
*G06F 16/23* (2019.01)

(52) U.S. Cl.
CPC ...... *G06F 11/1469* (2013.01); *G06F 16/2379* (2019.01); *G06F 2201/80* (2013.01)

(58) Field of Classification Search
CPC ............. G06F 11/1469; G06F 16/2379; G06F 2201/80
USPC ................................................... 707/600–899
See application file for complete search history.

(56) References Cited

U.S. PATENT DOCUMENTS

| | | | | |
|---|---|---|---|---|
| 10,795,777 | B1 * | 10/2020 | Goyal ................. | G06F 11/1464 |
| 11,461,192 | B1 * | 10/2022 | Brahmadesam .... | G06F 11/2048 |
| 11,656,953 | B2 * | 5/2023 | Thomsen .............. | G06F 16/908 |
| | | | | 707/674 |
| 11,860,724 | B2 * | 1/2024 | Chen ........................ | G06N 5/04 |
| 11,886,439 | B1 * | 1/2024 | Hwang ............. | G06F 16/24552 |
| 12,130,788 | B1 * | 10/2024 | Singh .................... | G06F 16/217 |
| 12,462,028 | B2 * | 11/2025 | Kumar .................. | G06F 21/554 |
| 2024/0256398 | A1 * | 8/2024 | Manchale Sridhar ...................... | |
| | | | | G06F 16/2358 |
| 2024/0303529 | A1 * | 9/2024 | Rane ...................... | G06N 20/00 |

OTHER PUBLICATIONS

SysTools Software, "SysTools SQL Recovery," https://www.systoolsgroup.com/sql-recovery.html#, Accessed May 13, 2024, 11 pages.

(Continued)

*Primary Examiner* — Michelle N Owyang

(74) *Attorney, Agent, or Firm* — Ryan, Mason & Lewis, LLP

(57) ABSTRACT

An apparatus comprises at least one processing device configured to detect, utilizing a machine learning model, anomalous transactions in a database system comprising first and second databases, the second database having a configurable disaster recovery delay time period relative to the first database. The at least one processing device is also configured to determine a recovery time point for the database system based on a transaction time of a given anomalous transaction, and to replay, from the first database to the second database, a first set of transactions occurring during the configurable disaster recovery delay time period up to the determined recovery time point, to validate recovery of the first set of transactions, and to replay, from the first database to the second database, a second set of transactions of the database system occurring after the determined recovery time point responsive to validating recovery of the first set of transactions.

20 Claims, 18 Drawing Sheets

(56) References Cited

OTHER PUBLICATIONS

Stellar Data Recovery, "Administrators Trusted SQL Database Recovery Tool," https://www.stellarinfo.com/sql-recovery.phpgad_source=1&gclid=CjwKCAjw9layBhBJEiwAVuc3fnrxStKpByyGph CEFGc6Erj1x9gCmbXQGJVuXaWflNmiExDA831DNRoCc3 kQAvD_BwE, Accessed May 13, 2024, 14 pages.
Quest Software, "SQL Server Data Recovery," https://www.apexsql. com/sql-tools-recover/, Accessed May 13, 2024, 16 pages.
Oracle, "Flashback Technologies," https://www.oracle.com/database/technologies/flashback/, Accessed May 13, 2024, 3 pages.

* cited by examiner

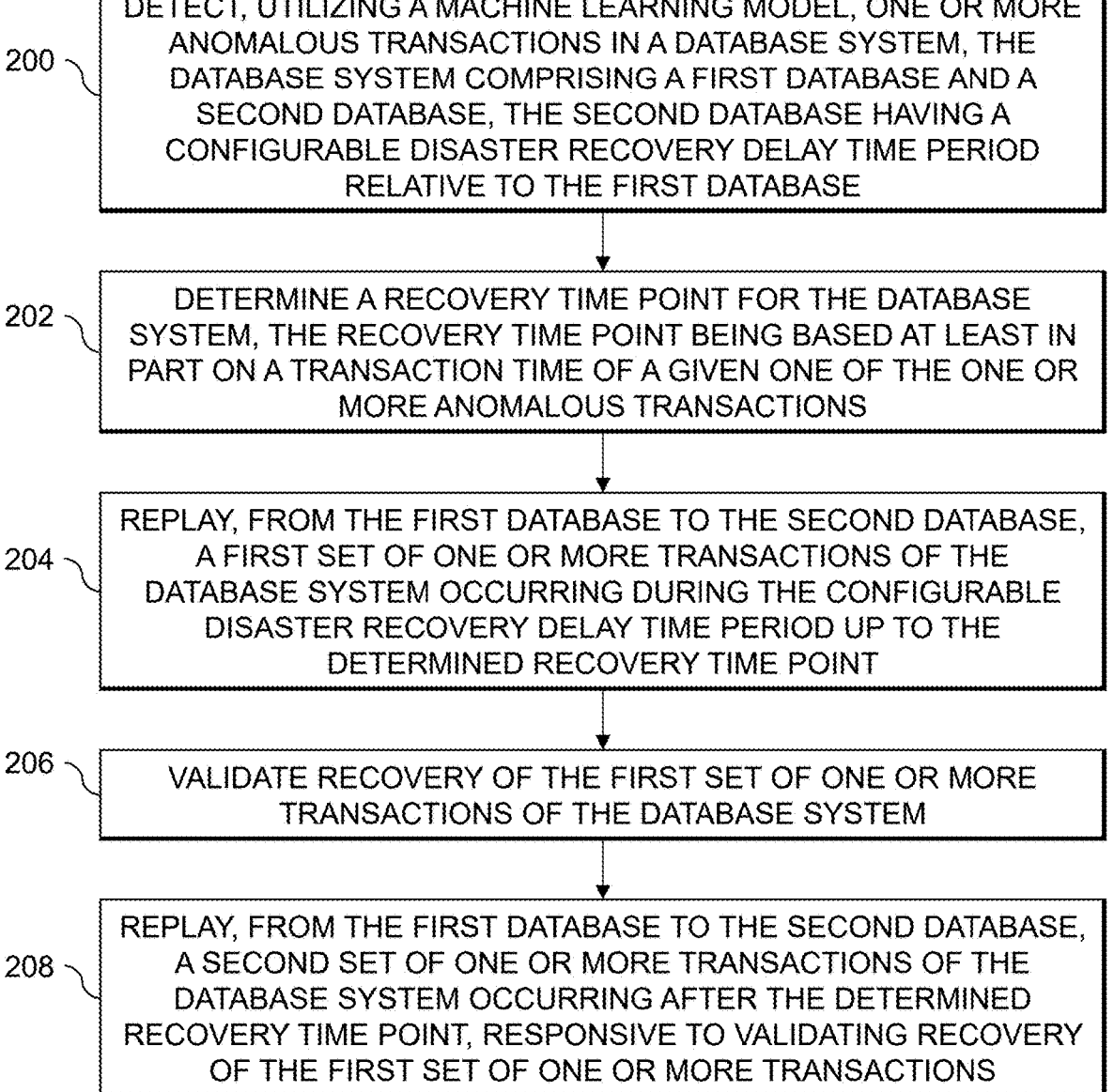

200 — DETECT, UTILIZING A MACHINE LEARNING MODEL, ONE OR MORE ANOMALOUS TRANSACTIONS IN A DATABASE SYSTEM, THE DATABASE SYSTEM COMPRISING A FIRST DATABASE AND A SECOND DATABASE, THE SECOND DATABASE HAVING A CONFIGURABLE DISASTER RECOVERY DELAY TIME PERIOD RELATIVE TO THE FIRST DATABASE

202 — DETERMINE A RECOVERY TIME POINT FOR THE DATABASE SYSTEM, THE RECOVERY TIME POINT BEING BASED AT LEAST IN PART ON A TRANSACTION TIME OF A GIVEN ONE OF THE ONE OR MORE ANOMALOUS TRANSACTIONS

204 — REPLAY, FROM THE FIRST DATABASE TO THE SECOND DATABASE, A FIRST SET OF ONE OR MORE TRANSACTIONS OF THE DATABASE SYSTEM OCCURRING DURING THE CONFIGURABLE DISASTER RECOVERY DELAY TIME PERIOD UP TO THE DETERMINED RECOVERY TIME POINT

206 — VALIDATE RECOVERY OF THE FIRST SET OF ONE OR MORE TRANSACTIONS OF THE DATABASE SYSTEM

208 — REPLAY, FROM THE FIRST DATABASE TO THE SECOND DATABASE, A SECOND SET OF ONE OR MORE TRANSACTIONS OF THE DATABASE SYSTEM OCCURRING AFTER THE DETERMINED RECOVERY TIME POINT, RESPONSIVE TO VALIDATING RECOVERY OF THE FIRST SET OF ONE OR MORE TRANSACTIONS

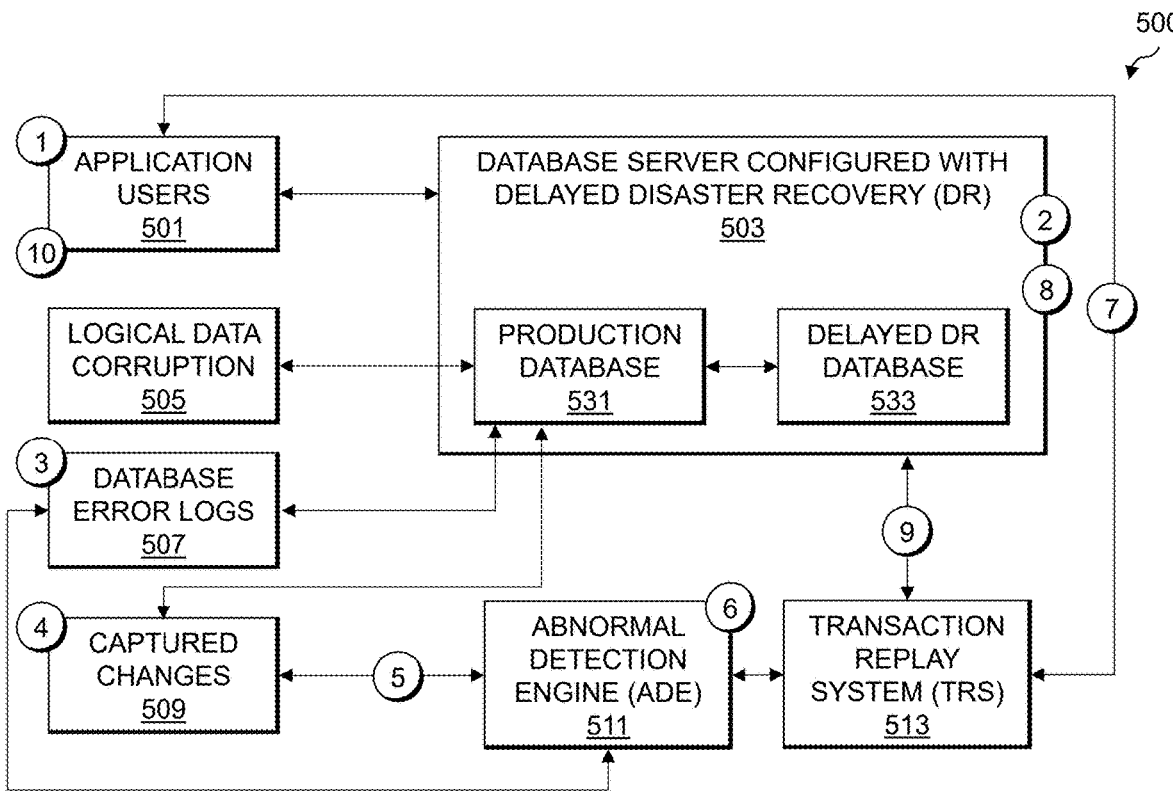

1  APPLICATION USERS EXECUTE DATA CHANGES, WHICH INCLUDES DELETING OR UPDATING DATA INADVERTENTLY OR DATA CORRUPTION CAUSED INTENTIONALLY OR BY TASKS

2  CONFIGURE DATABASE SERERS WITH DELAYED DISASTER RECOVERY

3  DATA CORRUPTION CAPTURED IN DATABASE LOGS

4  DATABASE CONFIGURED TO ENABLE CAPTURE OF DATABASE TRANSACTIONS

5  CAPTURED TRANSACTIONS AND DATABASE LOGS SENT TO ABNORMAL DETECTION ENGINE FOR ANOMALY DETECTION

6  ABNORMAL DETECTION ENGINE PERFORMS ANOMALY DETECTION AND NOTIFIES APPLICATION TEAM IN CASE OF ANY ISSUES

7  APPLICATION USERS VALIDATE AND CONFIRM ACCIDENTAL DATA MODIFICATION AND INITIATE DATA RECOVERY

8  TRANSACTION REPLAY SYSTEM INITIATES RECOVERY IN DELAYED DR DATABASE TO IDENTIFY TRANSACTIONS PRIOR TO ACCIDENTAL TRANSACTION

9  TRANSACTION REPLAY SYSTEM VALIDATES DATABASE RECOVERY AND INITIATES RECOVERY OF TRANSACTIONS AFTER THE ANOMALOUS TRANSACTION

10  APPLICATION USERS VALIDATE THE DATA AND CONFIRM THE RECOVERY

```
SELECT
      object_name(p.object_id) objectName,
      tlog.[Current LSN],
      T.begintime begintime,
      c.endTime endtime,
      tlog.Operation operation,
      T.account account FROM
      sys.objects so
      inner join sys.partitions p on p.object_id=so.object_id
      inner join sys.system_internals_allocation_units AU on p.partition_id=AU.container_id
      inner join ( )
```

605

| OBJECT NAME | BEGIN TIME | END TIME | ACCOUNT | INSERT | UPDATE | DELETE | TRUNCATE | DROP | ERROR |
|---|---|---|---|---|---|---|---|---|---|
| BACKUP CONFIG | TIME 1 | TIME 2 | BACKUP RECOVERY | 0 | 0 | 6115 | 0 | 0 | 0 |
| BACKUP CONFIG | TIME 3 | TIME 4 | BACKUP RECOVERY | 9 | 0 | 0 | 0 | 0 | 0 |
| BACKUP CONFIG | TIME 5 | TIME 6 | BACKUP RECOVERY | 9 | 0 | 0 | 0 | 0 | 0 |
| ... | ... | ... | ... | ... | ... | ... | ... | ... | ... |

```
import os
import pandas
import numpy
import sklearn.preprocessing
import joblib
import seaborn
import keras
import matplotlib.pyplot
import tensorflow
from keras.layers import Input, Dropout, Dense, LSTM, TimeDistributed, RepeatVector
%matplotlib inline
tensorflow.compat.v1.logging.set_verbosity(tensorflow.compat.v1.logging.ERROR)
numpy.random.seed(10)
Tensorflow.random.set_seed(10)

train = pandas.read_csv('transaction_data.csv', index_col=[0])
train.head()
test = pandas.read_csv('test_data.csv', index_col=[0])
test.head()
```

705

| | UPDATE | DELETE | TRUNCATE | DROP | ERROR |
|---|---|---|---|---|---|
| TIME1 | 5 | 5 | 0 | 0 | 0 |
| TIME2 | 89 | 3 | 0 | 0 | 0 |
| TIME3 | 87 | 8 | 0 | 0 | 0 |
| TIME4 | 56 | 9 | 0 | 0 | 0 |
| TIME5 | 10 | 4 | 0 | 0 | 0 |

```
scaler = sklearn.preprocessing.MinMaxScaler()
train_Scaler = scaler.fit_transform(train)
test_Scaler = scaler.transform(test)
joblib.dump(scaler, "scaler_data")
train_Scaler = train_Scaler.reshape(train_Scaler.shape[0], 1, train_Scaler.shape[1])
test_Scaler = test_Scaler.reshape(test_Scaler.shape[0], 1, test_Scaler.shape[1])

def LSTM_data_model(data):
        row_data = data.shape[1]
        column_data = data.shape[2]
        inputdata = Input(shape=(row_data, column_data))
        Level0 = LSTM (32, activation='relu', return_sequences=True,
                            kernel_regularizer=keras.regularizers.12(0.00))(inputdata)
        Level1 = LSTM(8, activation='relu', return_sequences=False)(Level0)
        Level2 = RepeatVector(row_data)(Level1)
        Level3 = LSTM(8, activation='relu', return_sequences=True)(Level2)
        Level4 = LSTM(32, activation='relu', return_sequences=True)(Level3)
        outputdata = TimeDistributed(Dense(column_data))(Level4)
        datamodel = keras.models.Model(inputs=inputdata, outputs=outputdata)
        return datamodel datamodel = LSTM_data_model(train_Scaler)
datamodel.compile(optimizer='adam', loss='mae')
datamodel.summary()
history = model.fit(train_Scaler, test_Scaler, epochs=200, batch_size=10, validation_split=0.05).history
```

```
predict_trained_model = model.predict(train_Scaler)
predict_trained_model = predict_trained_model.reshape(predict_trained_model.shape[0],
predict_trained_model.shape[2])
predict_trained_model = pandas.DataFrame(predict_trained_model, columns=train.columns)
predict_trained_model.index = train.index threshold_score = pandas.DataFrame(index=train.index)
train_model = train_Scaler.reshape(train_Scaler.shape[0], train_Scaler.shape[2])
threshold_score['MAE_Loss(Mean Absolute Error)'] = np.mean(np.abs(predict_trained_model-
train_model), axis = 1)
matplotlib.pyplot.figure(figsize=(16,8), dpi=90)
matplotlib.pyplot.title('Anomaly Threshold based on Loss Distribution', fontsize=15)
seaboarn.histplot(threshold_score['MAE_Loss(Mean Absolute Error)'], bins = 20, kde = True, color
= 'brown');
matplotlib.pyplot.xlim([0.00,.01])
```

1005

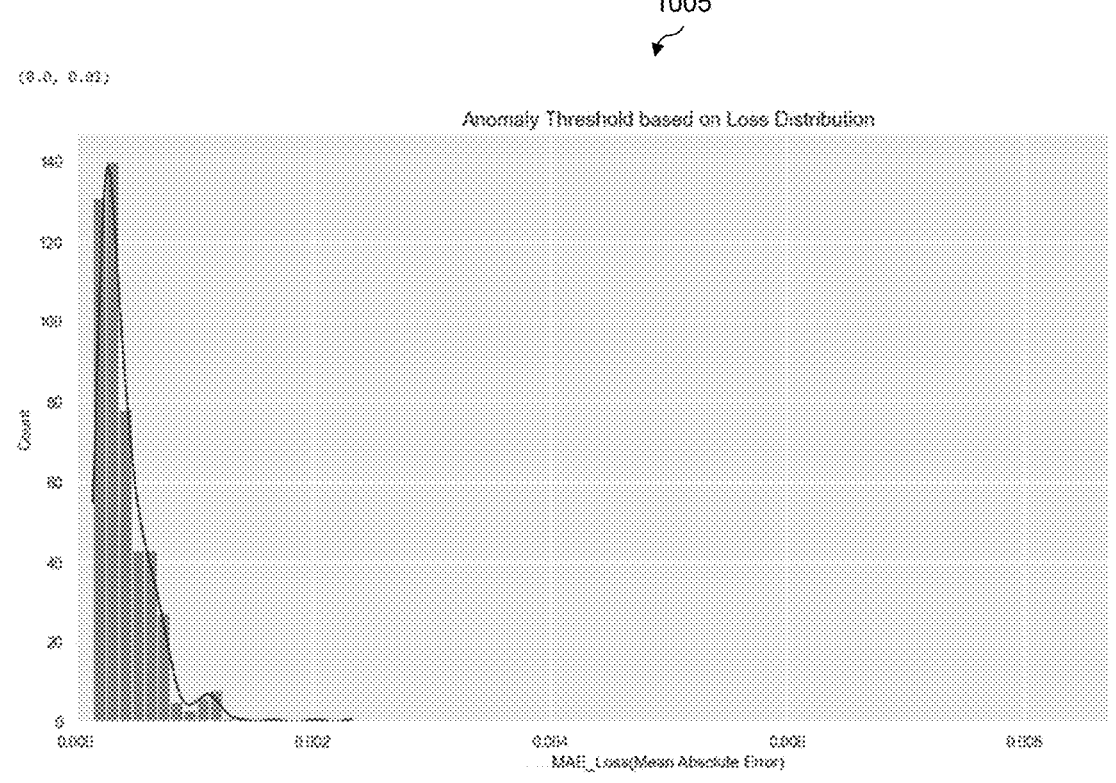

```
predict_test_model = model.predict(test_Scaler)
predict_test_model = predict_test_model.reshape(predict_test_model.shape[0],
predict_test_model.shape[2])
predict_test_model = pandas.DataFrame(predict_test_model, columns=test.columns)
predict_test_model.index = test.index score_test = pandas.DataFrame(index=test.index)
test_model = test_Scaler.reshape(test_Scaler.shape[0], test_Scaler.shape[2])
score_test['MAE_Loss(Mean Absolute Error)'] = numpy.mean(numpy.abs(predict_test_model-test_model),
axis = 1)
score_test['Anomaly_Threshold'] = 0.004
score_test['Anomaly'] = score_test['MAE_Loss(Mean Absolute Error)'] > score_test['Anomaly_Threshold']

predict_trained_model = model.predict(train_Scaler)
predict_trained_model = predict_trained_model.reshape(predict_trained_model.shape[0],
predict_trained_model.shape[2])
predict_trained_model = pandas.DataFrame(predict_trained_model, columns=train.columns)
predict_trained_model.index = train.index score_train = pandas.DataFrame(index=train.index)
score_train['MAE_Loss(Mean Absolute Error)'] = numpy.mean(numpy.abs(predict_trained_model-
train_model), axis = 1)
score_train['Anomaly_Treshold'] = 0.004
score_train['Anomaly'] = score_train['MAE_Loss(Mean Absolute Error)'] >
score_train['Anomaly_Threshold']
combined_score = pandas.concat([score_train, score_test])

combined_score_plot(logy=True, figsize=(15,8), ylim=[1e-4,1e1], color=['brown', 'blue'])
```

| | OBJECT NAME | TRANSACTION IDENTIFIER | BEGIN TIME | END TIME | ACCOUNT | INSERT | UPDATE | DELETE | TRUNCATE | DROP |
|---|---|---|---|---|---|---|---|---|---|---|
| 1 | APPS LIST | TRANS_ID1 | TIME_1 | TIME_2 | TEST USER | 0 | 186 | 0 | 0 | 0 |
| 2 | APPS LIST | TRANS_ID2 | TIME_3 | TIME_4 | TEST USER | 1 | 0 | 0 | 0 | 0 |
| 3 | APPS LIST | TRANS_ID3 | TIME_5 | TIME_6 | TEST USER | 1 | 0 | 0 | 0 | 0 |
| 4 | APPS LIST | TRANS_ID4 | TIME_7 | TIME_8 | TEST USER | 1 | 0 | 0 | 0 | 0 |
| 5 | APPS LIST | TRANS_ID1 | TIME_9 | TIME_10 | TEST USER | 1 | 0 | 0 | 0 | 0 |
| 6 | APPS LIST | TRANS_ID5 | TIME_11 | TIME_12 | TEST USER | 1 | 0 | 0 | 0 | 0 |
| 7 | APPS LIST | TRANS_ID6 | TIME_13 | TIME_14 | TEST USER | 0 | 6 | 0 | 0 | 0 |
| 8 | APPS LIST | TRANS_ID7 | TIME_15 | TIME_16 | TEST USER | 1 | 0 | 0 | 0 | 0 |
| 9 | APPS LIST | TRANS_ID8 | TIME_17 | TIME_18 | TEST USER | 1 | 0 | 0 | 0 | 0 |
| 10 | APPS LIST | TRANS_ID9 | TIME_19 | TIME_20 | TEST USER | 1 | 0 | 0 | 0 | 0 |
| 11 | APPS LIST | TRANS_ID10 | TIME_21 | TIME_22 | TEST USER | 0 | 7 | 0 | 0 | 0 |

| | ROW NUMBER | APPLICATION IDENTIFIER | APPLICATION REFERENCE IDENTIFIER | DATUM | TRANSACTION | PREVIOUS ROW NUMBER | TIME | TRANSACTION IDENTIFIER | SLOT IDENTIFIER | LOG SEQUENCE NUMBER (LSN) |
|---|---|---|---|---|---|---|---|---|---|---|
| 1 | 1 | APP_ID1 | APP_REF_ID1 | RESTORATION | UPDATE | 0 | TIME_1 | TRANS_ID1 | 0 | LSN_1 |
| 2 | 3 | APP_ID2 | APP_REF_ID1 | RESTORATION | UPDATE | 0 | TIME_1 | TRANS_ID1 | 1 | LSN_2 |
| 3 | 5 | APP_ID3 | APP_REF_ID1 | RESTORATION | UPDATE | 0 | TIME_1 | TRANS_ID1 | 2 | LSN_3 |
| 4 | 7 | APP_ID4 | APP_REF_ID2 | RESTORATION | UPDATE | 0 | TIME_1 | TRANS_ID1 | 3 | LSN_4 |
| 5 | 9 | APP_ID5 | APP_REF_ID2 | RESTORATION | UPDATE | 0 | TIME_1 | TRANS_ID1 | 4 | LSN_5 |
| 6 | 11 | APP_ID6 | APP_REF_ID2 | RESTORATION | UPDATE | 0 | TIME_1 | TRANS_ID1 | 5 | LSN_6 |
| 7 | 13 | APP_ID7 | APP_REF_ID2 | RESTORATION | UPDATE | 0 | TIME_1 | TRANS_ID1 | 6 | LSN_7 |
| 8 | 15 | APP_ID8 | APP_REF_ID2 | RESTORATION | UPDATE | 0 | TIME_1 | TRANS_ID1 | 7 | LSN_8 |
| 9 | 17 | APP_ID9 | APP_REF_ID2 | RESTORATION | UPDATE | 0 | TIME_1 | TRANS_ID1 | 8 | LSN_9 |
| 10 | 19 | APP_ID10 | APP_REF_ID3 | RESTORATION | UPDATE | 0 | TIME_1 | TRANS_ID1 | 9 | LSN_10 |
| 11 | 21 | APP_ID11 | APP_REF_ID4 | RESTORATION | UPDATE | 0 | TIME_1 | TRANS_ID1 | 10 | LSN_11 |
| 12 | 23 | APP_ID12 | APP_REF_ID5 | RESTORATION | UPDATE | 0 | TIME_1 | TRANS_ID1 | 11 | LSN_12 |
| 13 | 25 | APP_ID13 | APP_REF_ID6 | RESTORATION | UPDATE | 0 | TIME_1 | TRANS_ID1 | 12 | LSN_13 |

| ROW NUMBER | APPLICATION IDENTIFIER | APPLICATION REFERENCE IDENTIFIER | DATUM | TRANSACTION | PREVIOUS ROW NUMBER | TIME | TRANSACTION IDENTIFIER | SLOT IDENTIFIER | LOG SEQUENCE NUMBER (LSN) |
|---|---|---|---|---|---|---|---|---|---|
| 376 | APP_ID14 | APP_REF_ID1 | RESTORATION | INSERT | 70 | TIME_2 | TRANS_ID1 | 34 | LSN_14 |
| 378 | APP_ID3 | APP_REF_ID1 | RESTORATION | UPDATE | 6 | TIME_3 | TRANS_ID2 | 2 | LSN_15 |
| 380 | APP_ID4 | APP_REF_ID1 | RESTORATION | UPDATE | 8 | TIME_3 | TRANS_ID2 | 3 | LSN_16 |
| 382 | APP_ID5 | APP_REF_ID7 | RESTORATION | UPDATE | 10 | TIME_3 | TRANS_ID2 | 4 | LSN_17 |
| 384 | APP_ID6 | APP_REF_ID7 | RESTORATION | UPDATE | 12 | TIME_3 | TRANS_ID2 | 5 | LSN_18 |
| 386 | APP_ID7 | APP_REF_ID7 | RESTORATION | UPDATE | 14 | TIME_3 | TRANS_ID2 | 6 | LSN_19 |
| 388 | APP_ID8 | APP_REF_ID7 | RESTORATION | UPDATE | 16 | TIME_3 | TRANS_ID2 | 7 | LSN_20 |
| 390 | APP_ID15 | APP_REF_ID7 | RESTORATION | INSERT | 24 | TIME_4 | TRANS_ID3 | 11 | LSN_21 |
| 392 | APP_ID1 | APP_REF_ID1 | RESTORATION | INSERT | 375 | TIME_5 | TRANS_ID4 | 0 | LSN_22 |
| 394 | APP_ID16 | APP_REF_ID2 | REFERENCE | UPDATE | 393 | TIME_6 | TRANS_ID5 | 40 | LSN_23 |
| 396 | APP_ID17 | APP_REF_ID2 | REFERENCE | UPDATE | 395 | TIME_6 | TRANS_ID5 | 41 | LSN_24 |
| 398 | APP_ID18 | APP_REF_ID2 | REFERENCE | UPDATE | 397 | TIME_6 | TRANS_ID5 | 42 | LSN_25 |
| 400 | APP_ID19 | APP_REF_ID2 | REFERENCE | UPDATE | 399 | TIME_6 | TRANS_ID5 | 43 | LSN_26 |

FIG. 15

ANOMALOUS TRANSACTION RECOVERY IN DATABASE SYSTEMS

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for anomalous transaction recovery in database systems.

In one embodiment, an apparatus comprises at least one processing device comprising a processor coupled to a memory. The at least one processing device is configured to detect, utilizing a machine learning model, one or more anomalous transactions in a database system, the database system comprising a first database and a second database, the second database having a configurable disaster recovery delay time period relative to the first database. The at least one processing device is also configured to determine a recovery time point for the database system, the recovery time point being based at least in part on a transaction time of a given one of the one or more anomalous transactions, and to replay, from the first database to the second database, a first set of one or more transactions of the database system occurring during the configurable disaster recovery delay time period up to the determined recovery time point. The at least one processing device is further configured to validate recovery of the first set of one or more transactions of the database system, and to replay, from the first database to the second database, a second set of one or more transactions of the database system occurring after the determined recovery time point, responsive to validating recovery of the first set of one or more transactions. These and other illustrative embodiments include, without limitation, methods, apparatus, networks, systems and processor-readable storage media.

BRIEF DESCRIPTION OF THE DRAWINGS

FIG. 2 is a flow diagram of an exemplary process for anomalous transaction recovery in database systems in an illustrative embodiment.

FIG. 5 shows a system flow for intelligent database recovery through detection of anomalous database transactions and transaction replay to a delayed disaster recovery database in an illustrative embodiment.

FIG. 6 shows pseudocode for capturing transactions and error logs from a database and a table of information from the captured transactions and error logs in an illustrative embodiment.

FIG. 7 shows pseudocode for processing transaction details for training and validation of a machine learning model and a table representing the processed transaction details in an illustrative embodiment.

FIG. 9 shows pseudocode for training a machine learning model implemented by an abnormal detection engine of a database recovery tool in an illustrative embodiment.

FIG. 10 shows pseudocode for generating a plot of an anomaly threshold based on loss distribution for a trained machine learning model implemented by an abnormal detection engine of a database recovery tool in an illustrative embodiment.

FIGS. 11A and 11B show pseudocode for testing of a machine learning model implemented by an abnormal detection engine of a database recovery tool along with a plot of the anomaly threshold and loss in an illustrative embodiment.

FIG. 13 shows a table of transaction record details captured from a production database in an illustrative embodiment.

FIG. 14 shows a table of drill-down information for an anomalous transaction record in an illustrative embodiment.

FIG. 15 shows a table of transactions occurring in a production database following a transaction determined to be erroneous in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
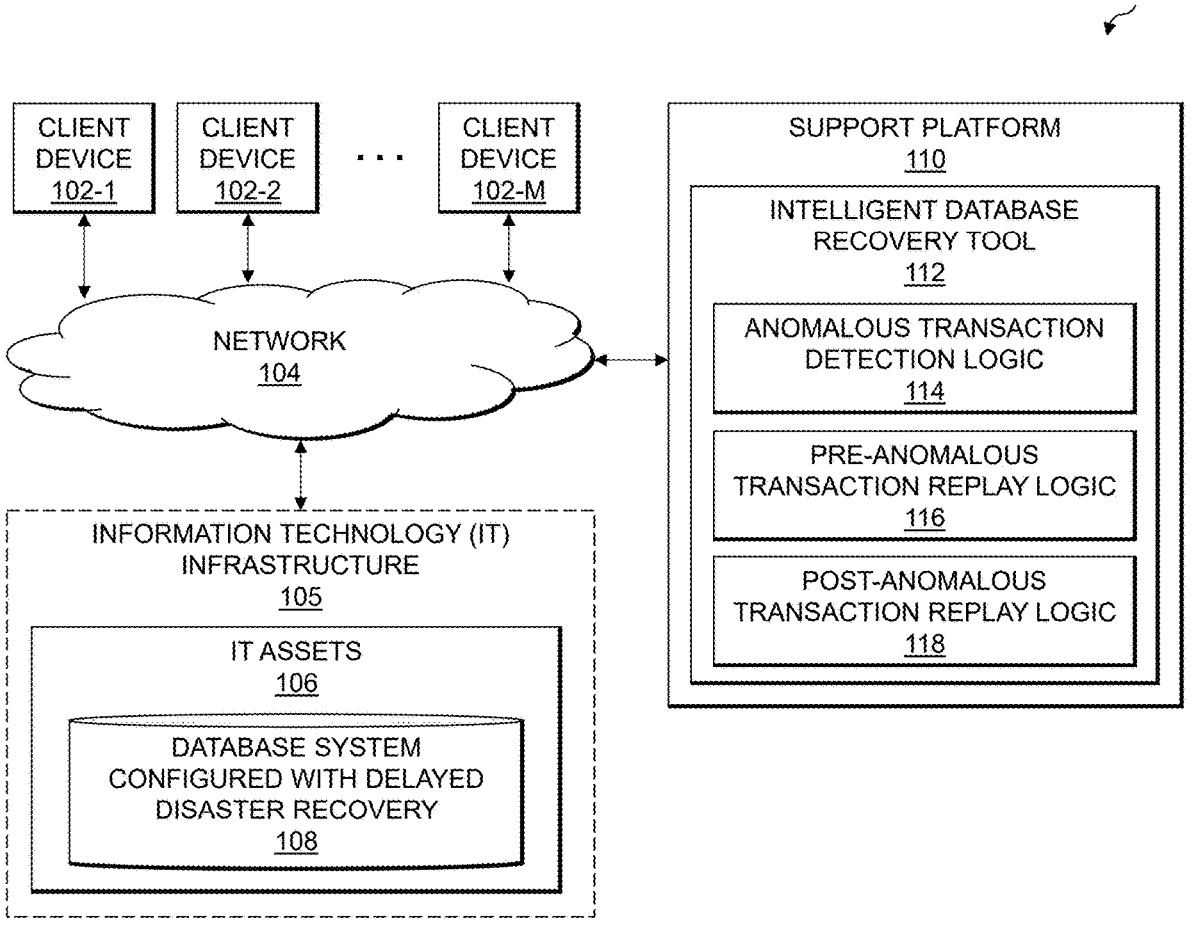
FIG. 1 is a block diagram of an information processing system configured for anomalous transaction recovery in database systems in an illustrative embodiment.

FIG. 1 shows an information processing system 100 configured in accordance with an illustrative embodiment. The information processing system 100 is assumed to be built on at least one processing platform and provides functionality for anomalous transaction recovery in database systems. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106 implementing a database system 108 configured with delayed disaster recovery (DR), and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing database recovery for one or more databases implemented by the database system 108. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The database system 108 is configured with delayed DR, and includes a primary database (e.g., a production database)

and a secondary database (e.g., a delayed DR database). The database system 108 transmits data between the primary and secondary databases with a configurable delayed DR time frame (e.g., X minutes, hours, etc.). The database system 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform validation of anomalous transactions, to confirm recovery of a database (e.g., both up to a recovery time point corresponding to a time of an anomalous transaction, and following replay of transactions subsequent to the time of the anomalous transaction). In some embodiments, the client devices 102 are assumed to be associated with system administrators, IT managers or other authorized personnel responsible for managing the database system 108 for an enterprise, organization or other entity. In some embodiments, the client devices 102 are utilized by members of the same enterprise, organization or other entity that operates the support platform 110. In other embodiments, the client devices 102 are utilized by members of one or more enterprises, organizations or other entities different than the enterprise, organization or other entity that operates the support platform 110 (e.g., a first enterprise provides support functionality for database systems for multiple different customers, businesses, etc.). Various other examples are possible.

In some embodiments, the client devices 102 and/or the IT assets 106 of the IT infrastructure 105 may implement host agents that are configured for automated transmission of information with the database system 108 and the support platform 110. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements an intelligent database recovery tool 112. The intelligent database recovery tool 112 comprises anomalous transaction detection logic 114, pre-anomalous transaction replay logic 116, and post-anomalous transaction replay logic 118. The anomalous transaction detection logic 114 is configured to proactively detect anomalous transactions in the database system 108, and may utilize one or more machine learning models such as a Long Short-Term Memory (LSTM) Auto-encoder model. The anomalous transaction detection logic 114 is further configured to confirm (e.g., based on input from the client devices 102) that a given anomalous transaction is, in fact, erroneous. If the given anomalous transaction is confirmed as erroneous, the anomalous transaction detection logic 114 is configured to determine a recovery point (e.g., corresponding to a time of the given anomalous transaction. The pre-anomalous transaction replay logic 116 will replay transactions to the secondary database (e.g., the delayed DR database) of the database system 108 up until the determined recovery point. Once recovery up to the determined recovery point is validated, the post-anomalous transaction replay logic 118 replays transactions to the secondary database (e.g., the delayed DR database) of the database system 108 until a current time. Once this recovery is validated, the secondary database (e.g., the delayed DR database) will be set as active in the database system 108.

At least portions of the intelligent database recovery tool 112, the anomalous transaction detection logic 114, the pre-anomalous transaction replay logic 116 and the post-anomalous transaction replay logic 118 may be implemented at least in part in the form of software that is stored in memory and executed by a processor.

It is to be appreciated that the particular arrangement of the client devices 102, the IT infrastructure 105, the database system 108 and the support platform 110 illustrated in the FIG. 1 embodiment is presented by way of example only, and alternative arrangements can be used in other embodiments. As discussed above, for example, the support platform 110 (or portions of components thereof, such as one or more of the intelligent database recovery tool 112, the anomalous transaction detection logic 114, the pre-anomalous transaction replay logic 116 and the post-anomalous transaction replay logic 118) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the database system 108 and the support platform 110 or components thereof (e.g., the intelligent database recovery tool 112, the anomalous transaction detection logic 114, the pre-anomalous transaction replay logic 116 and the post-anomalous transaction replay logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the database system 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the database system 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 16 and 17.

It is to be understood that the particular set of elements shown in FIG. 1 for anomalous transaction recovery in database systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for anomalous transaction recovery in database systems will now be described in more detail with reference to the flow diagram of FIG. 2. It is to be understood that this particular process is only an example, and that additional or alternative processes for anomalous transaction recovery in database systems may be used in other embodiments.

In this embodiment, the process includes steps 200 through 208. These steps are assumed to be performed by the support platform 110 utilizing the intelligent database recovery tool 112, the anomalous transaction detection logic 114, the pre-anomalous transaction replay logic 116 and the post-anomalous transaction replay logic 118. The process begins with step 200, detecting, utilizing a machine learning model, one or more anomalous transactions in a database system, the database system comprising a first database and a second database, the second database having a configurable disaster recovery delay time period relative to the first database. The machine learning model may comprise a Long Short-Term Memory (LSTM) model, or a LSTM Autoencoder model. The first database may comprise a production database in the database system. The first database may comprise a relational database. The machine learning model may take as input time series data characterizing transactions occurring in the database system. The time series data characterizing the transactions occurring in the database system may be determined based at least in part on event logs generated by the database system. The one or more anomalous transactions may be associated with one or more application users of the database system inadvertently deleting or updating data in the database system, logical data corruption in the database system caused by one or more scheduled database jobs, etc.

In step 202, a recovery time point for the database system is determined. The recovery time point is based at least in part on a transaction time of a given one of the one or more anomalous transactions. The given anomalous transaction may be confirmed as an erroneous transaction based at least in part on user input.

In step 204, a first set of one or more transactions of the database system occurring during the configurable disaster recovery delay time period up to the determined recovery time point are replayed from the first database to the second database. The FIG. 2 process may include, prior to replay of the first set of one or more transactions of the database system from the first database to the second database, terminating a data synchronization between the first database and the second database.

In step 206, recovery of the first set of one or more transactions of the database system is validated. Responsive to validating recovery of the first set of one or more transactions, a second set of one or more transactions of the database system occurring after the determined recovery time point are replayed from the first database to the second database in step 208. The first and second sets of one or more transactions of the database system may be determined utilizing log sequence numbers assigned to transactions of the database system. The FIG. 2 process may further include validating recovery of the second set of one or more transactions of the database system and, responsive to validating recovery of the second set of one or more transactions of the database system, setting the second database as a primary database of the database system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different database systems, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Data is indispensable for effective and efficient operation of an enterprise, organization or other entity, regardless of the importance of the data that enables fundamental functions of the enterprise, organization or other entity. If information is corrupted, lost or inaccessible, it hinders operations and decisions. Additionally, this has a chain of effects on experience and productivity.

Databases and the data stored therein are expected to be highly accessible at all times. However, accidental operations such as the deletion of data, performing update or delete operations in a database without appropriately applying a "where" condition, or truncating data through any database channels can have a significant impact on an entity's operations. To recover deleted or corrupted data in such scenarios, database backup procedures may be utilized. Database backup may be performed at the table level, the schema level, or the database level, and is a time-consuming and resource-intensive process. Database backup is also primarily reactive. For example, if the table size is around 20 terabytes (TB) on average, it may take a database engineer approximately 21 hours to complete the recovery process, which also necessitates outage and may result in data loss between the time of failure and the time of complete recovery.

Illustrative embodiments provide technical solutions for detecting discrepancies in transactions in a systematic manner and eliminating them from the database without losing any data. A transaction replay system (TRS) (e.g., which operates like video playback) provides access to information regarding Data Manipulation Language (DML) commands (e.g., update, delete, etc.), Data Definition Language (DDL) commands (e.g., truncate, drop, etc.), and logical file corruption. The technical solutions described herein are advantageously able to detect data deletion anomalies and optimize or improve data recovery processes, thereby accelerating the recovery of deleted or corrupted data from large databases and reducing the recovery time (e.g., from days/hours to minutes). To do so, the technical solutions described herein replace specific data within a database without reverting the entire database. Lost tables are retrieved directly to a database, including tables with calculated columns or absent schema and user-defined data type definitions. For instance, 20 TB of data can be recovered in 10 minutes, minimizing application disruption. The technical solutions described herein may be used with various types of databases, including relational database management systems (e.g., Structured Query Language (SQL) Server, Oracle, PostgreSQL, etc.).

In an IT infrastructure environment, database disruptions occur for a variety of reasons. Due to these database disruptions, application teams and database administrators (DBAs) invest approximately 40 to 50 hours per month recovering data. Applications or data consumers must wait until the recovery is complete during this time. Conventional approaches for database table data or object recovery require restoring the entire database, even if only a small number of rows or records are lost.

The technical solutions described herein provide functionality for systematically detecting erroneous database transactions conducted by application users, jobs or applications, and removes only the transactions with discrepancies and subsequent database transactions are replayed. In some embodiments, the technical solutions are used for database configurations with a disaster recovery (DR) delay. The technical solutions described herein provide functionality for continuously collecting database transaction logs, analyzing the logs to identify any abnormal transaction behavior, and then initiating action to recover data by replaying transactions.

Figure 3:
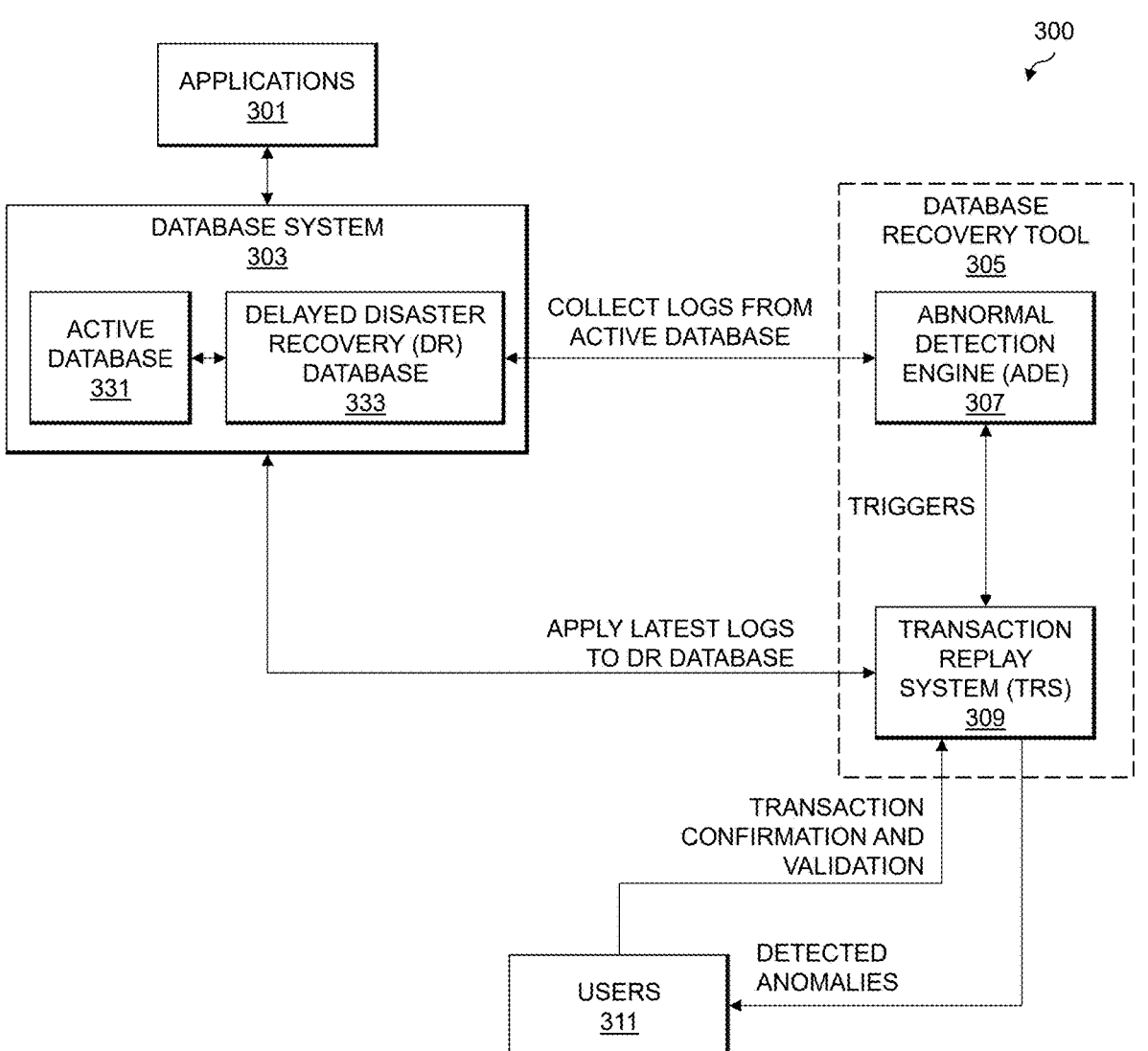
FIG. 3 shows a system configured for intelligent database recovery through detection of anomalous database transactions and transaction replay to a delayed disaster recovery database in an illustrative embodiment.

FIG. 3 shows a system 300 including one or more applications 301 which utilize a database system 303 comprising an active (or production) database 331 and a delayed DR database 333. The system 300 includes a database recovery tool 305 comprising an abnormal detection engine (ADE) 307 and a transaction replay system (TRS) 309. The ADE 307 collects logs from the active database 331, and triggers the TRS 309 to perform recovery on detecting anomalous transactions. The TRS 309 provides detected anomalies to users 311, and the users 311 perform transaction confirmation and validation. The TRS 309, on confirming and validating an erroneous transaction, will apply latest logs to the delayed DR database 333 in order to perform data recovery.

The ADE 307 may implement a long short-term memory (LSTM)-driven autoencoder or other machine learning model that is configured to identify anomalies in time series data extracted from the logs (e.g., transaction logs, error logs, etc.) collected from the active database 331. Normal data (e.g., without anomalies) is used to train the model so that it can comprehend the normal behavior of the database system 303. When the model receives an anomalous transaction, it detects this in the logs and sends a trigger to the TRS 309.

The TRS 309 is configured to identify the modified transaction details (e.g., for anomalous transactions) and notifies the users 311. Through a portal or user interface (UI) of the TRS 309, the users 311 can review and validate the identified anomalous transactions and affirm further actions such as retrieving the data or ignoring the transactions. This can be administered automatically through the configuration of user-defined protocols. If the users 311 confirm the recovery of the anomalous transaction, the TRS 309 will initiate recovery of the delayed DR database 333 to the transaction time confirmed by the users 311. The TRS 309 will then validate the Log Sequence Number (LSN) of the transaction with the most recent LSN of the database to confirm that the database is recovered to the correct recovery point. The TRS 309 will initiate the replay of the most recent transactions that occurred in production after the execution of the erroneous transaction once data recovery to the recovery point prior to the occurrence of the erroneous transaction has been completed. After the recovered database has been fully synchronized with the production instance (e.g., the active database 331), the database system 303 is shifted to the DR instance (e.g., the delayed DR database 333) as the primary database. The users 311 can validate the data following the conclusion of the recovery operations. The database recovery tool 305 is able to recover table data quickly (e.g., in approximately 10 minutes in some embodiments) with minimal downtime for the database system 303 and without any additional storage requirements.

Figure 4:
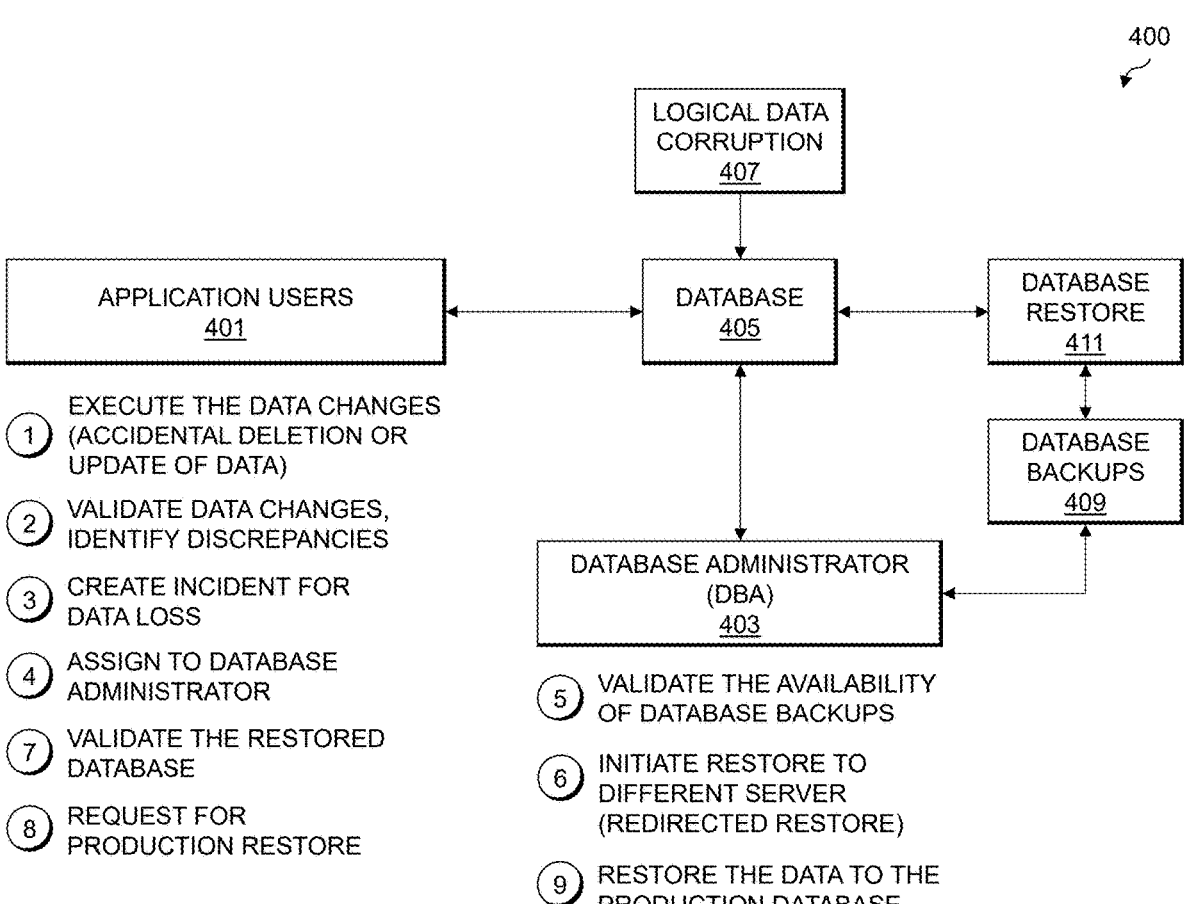
FIG. 4 shows a system flow for manual database recovery in an illustrative embodiment.

In a delete or update query, an application deletes records from or updates records in a table of a database. If the delete or update query is initiated without a "where" condition, or with an incorrect value in the "where" condition clause, data loss or corruption may occur (e.g., updating the wrong data, deleting the wrong table, performing a truncate operation on the wrong table, etc.). If this occurs on a large table, the recovery time may be significant (e.g., several days). FIG. 4 shows a system flow 400 for database recovery in the case of inadvertent or accidental deletion or update of data or other data corruption caused intentionally or by tasks or jobs running on a database system. FIG. 4 shows application users 401 and a database administrator (DBA) 403 which perform various tasks on a database 405. The database 405 may be subject to logical data corruption 407. In response thereto, the DBA 403 is configured to utilize database backups 409 to perform database restore 411. The system flow 400 is subject to various technical challenges, including: requiring manual involvement to detect transactions with discrepancies; requiring database recovery to performed online (e.g., for data loss caused by DML); and requiring full database backup or other point-in-time recovery (PITR) restore that takes significant time. The system flow 400 includes steps 1-10, described below, where steps 1-4, 7 and 8 are performed by the application users 401 and steps 5, 6 and 9 are performed by the DBA 403.

1. The application users 401 delete or update data inadvertently, or logical data corruption 407 occurs intentionally or by tasks;
2. The application users 401 validate the data corruption or deletion manually, and identify the time for data loss;
3. The application users 401 log an incident to a database engineering team to recover the lost data;
4. The incident is assigned (e.g., by an IT infrastructure monitoring tool) to the DBA 403;
5. The DBA 403 validates the availability of the full database and log backups (e.g., database backups 409) for the database 405;
6. The DBA 403 initiates a manual restore of the database to a different server (e.g., redirected restore);
7. The application users 401 validate the data in the recovered database;
8. The application users 401 request to copy the data from the recovered database to production; and
9. The DBA 403 copies the data to the production database through an import/export method.

The system flow 400 is time-consuming, and will take longer for larger databases based on the time of data loss, volume of transactions, and backup frequency.

In a highly transactional environment, erroneous transactions (e.g., accidental data delete, update, or truncate DML changes, drop table DDL changes by applications or database users through scripts, jobs or applications while conducting data updates) are a common occurrence. While some users may recognize incorrect updates immediately or quickly, business or application validation identifies the majority of such instances later in manual review. Even though the data loss is identified, it is a laborious manual process to determine the time and record-level specifics. Existing processes and tools lack the intelligence to detect erroneous transactions systematically and capture information such as time, user details and data loss/corruption records.

Conventional database recovery tools are designed to recover data loss caused by DML statements (e.g., delete, update, etc.), whereas DDL statements (e.g., truncate, drop, etc.) require a full database backup restore and PITR of transaction logs. Recovery of the database is dependent on database size, network bandwidth, and the availability of backups for the restore, with larger databases requiring hours to recover. Conventional approaches for recovering the data for DDL statements (e.g., truncate) require a full database restore and PITR to recover the data, and can only recover the data up to the point before the occurrence of erroneous transactions. Such conventional approaches lack the ability to restore the changes made to data in production after the occurrence of erroneous transactions (e.g., replay of transactions after the issue occurs).

The technical solutions described herein, in some embodiments, leverage Relational Database Management System (RDBMS) databases with a delayed DR configuration within the production databases. Delayed replication/log shipment is a database feature that delays the synchronization of data from the primary database to the DR database. Database engineers can configure the time frame (e.g., X minutes, hours, etc.) in data transmission between the primary and secondary (delayed DR) database based on the environment requirements.

FIG. 5 shows a system flow 500 for database recovery using the technical solutions described herein. FIG. 5 shows application users 501 which interact with a database server 503 configured with delayed DR comprising a production database 531 and a delayed DR database 533. The database server 503 may be subject to logical data corruption 505. The production database 531 generates database error logs 507 from which changes are captured 509. The ADE 511 utilizes the database error logs 507 and the captured changes 509 to detect anomalous transactions, and triggers the TRS 513 to perform recovery (e.g., after validation by the application users 501). The system flow 500 includes steps 1-10, described in further detail below:

1. The application users 501 delete or update data inadvertently in the production database 531, or the production database 531 is subject to logical data corruption 505 caused intentionally or by tasks;

2. The database server 503 is configured with delayed DR, which replicates data from the production database 531 to the delayed DR database 533 (e.g., with X hours of delay);

3. Data corruption in the production database 531 is captured in the database error (or event) logs 507;

4. The production database 531 is configured to capture database transactions as the captured changes 509;

5. The database error logs 507 and captured changes 509 are sent to the ADE 511 for anomaly detection;

6. The ADE 511 performs anomaly detection and triggers the TRS 513, which notifies an application team (e.g., the application users 501) in case of any issues;

7. The application users 501 validate and confirm the accidental data modification and initiate data recovery;

8. The TRS 513 initiates recovery in the delayed DR database 533 to identify the transactions prior to the anomalous transaction;

9. The TRS 513 validates the database recovery, and initiates data recovery for transactions following the anomalous transaction by comparing the LSN from the recovered database; and 10. The application users 501 validate the data and confirm the recovery.

The ADE 511 may utilize an LSTM autoencoder, which is a type of artificial recurrent neural network (RNN). This network is based on the structure of RNNs, which are designed to handle sequential data, where the output from the previous step is fed as input to the current step. LSTM is an improved version of an RNN, and has three different "memory" gates: a forget gate, an input gate, and an output gate. The forget gate controls what information in the cell state to forget, given the latest information that is entered from the input gate. Transactions of a database may be considered time series data, and LSTM is a good fit for time series data. The goal in some embodiments is not only to forecast a single metric, but to find a global anomaly in all metrics combined (e.g., update, delete, truncate, drop object operations, error logs, etc.). The LSTM alone cannot provide the global perspective needed, and thus an autoencoder is added. The LSTM autoencoder is an implementation of an autoencoder for sequential data using an Encoder-Decoder LSTM architecture. The LSTM autoencoder implemented by the ADE 511 in some embodiments will detect anomalies in database transactions and send the details of anomalous transactions to application users 501 (e.g., based on the account executing the anomalous transactions). Once the application users 501 confirm that a transaction is in fact anomalous, the transaction time will be passed to the data recovery engine (e.g., the TRS 513) to recover the database (e.g., before the execution of that transaction based on the transaction time).

The input to the LSTM autoencoder model includes database error logs 507 and transactions (e.g., the captured changes 509) as a time series and is fed as an input to the LSTM autoencoder model (e.g., through a comma separated value (CSV) file). These data can also be captured through change data capture mechanisms. Data is pre-processed at the database by extracting the details of update, delete, truncate and drop transactions for each of the database objects from the database. Error log information is also captured to identify the data corruption (e.g., because of the loss/deletion of files and file groups at the database). FIG. 6 shows pseudocode 600 for capturing transactions and error logs, along with a table 605 of the captured information (e.g., including object name, begin time, end time, account, numbers of insert, update, delete, truncate and job operations, and a number of errors).

Figure 8:
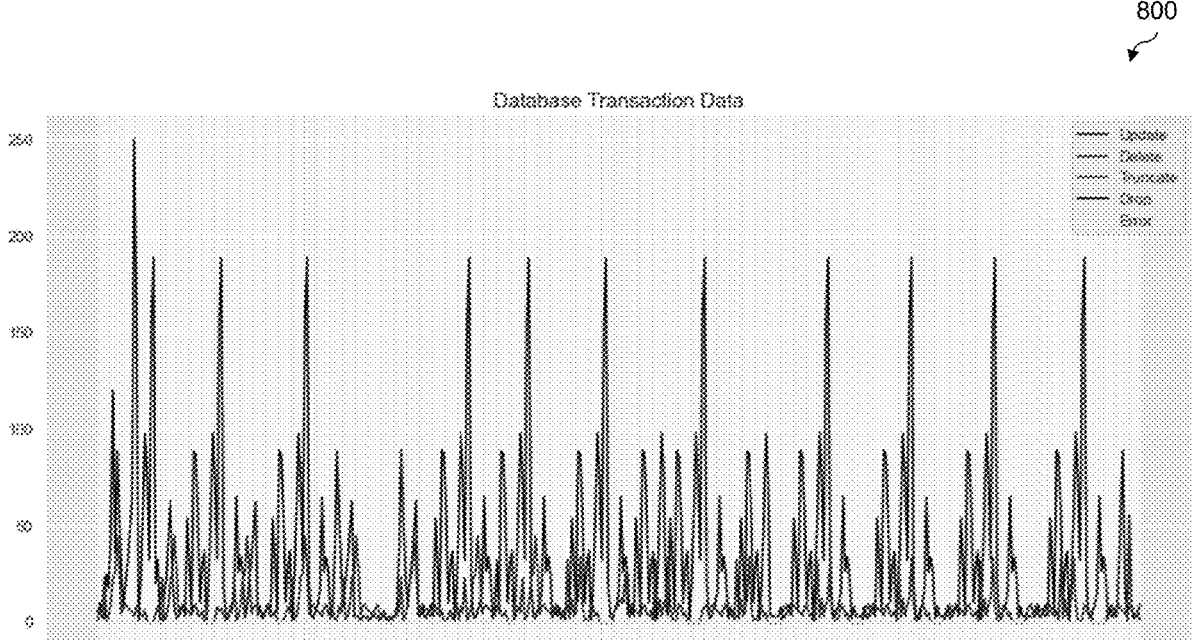
FIG. 8 shows a plot of a distribution of database transactions in an illustrative embodiment.

Output of the transaction and error count details (e.g., shown in table 605) from the database is passed as an input to the LSTM autoencoder model for anomaly detection in the database transactions. Update, delete, truncate, drop and error counts for each database object are considered for detection of erroneous transactions. FIG. 7 shows pseudocode 700 for initializing machine learning libraries and passing the transaction details (e.g., in CSV format) as input for training and validation of the model. FIG. 7 also shows a table 705 representing the transaction details. The transaction_data.csv file is the subset of database transactions without any anomalies, and the test_data.csv file is the subset of the database transactions which contain normal as well as erroneous transactions. Data in the transaction_data.csv file is used to train the LSTM model and data in the test_data.csv file is used to validate the data model. FIG. 8 shows a plot 800 of the distribution of database transactions (e.g., update, delete, truncate, drop, error) in an idle state (e.g., from the transcation_data.csv file).

The LSTM autoencoder model has multiple layers of neural networks, in which one or more layers will take the input and create the compressed representation of data. The encoder then uses a repeat vector layer to distribute the compressed data across time steps of the decoder. In some embodiments, the model uses the Adam optimizer for the compilation. Normal database transactions (e.g., in the transaction_data.csv file) are used for training the model. FIG. 9 shows pseudocode 900 for training the LSTM autoencoder model.

Figure 11B:
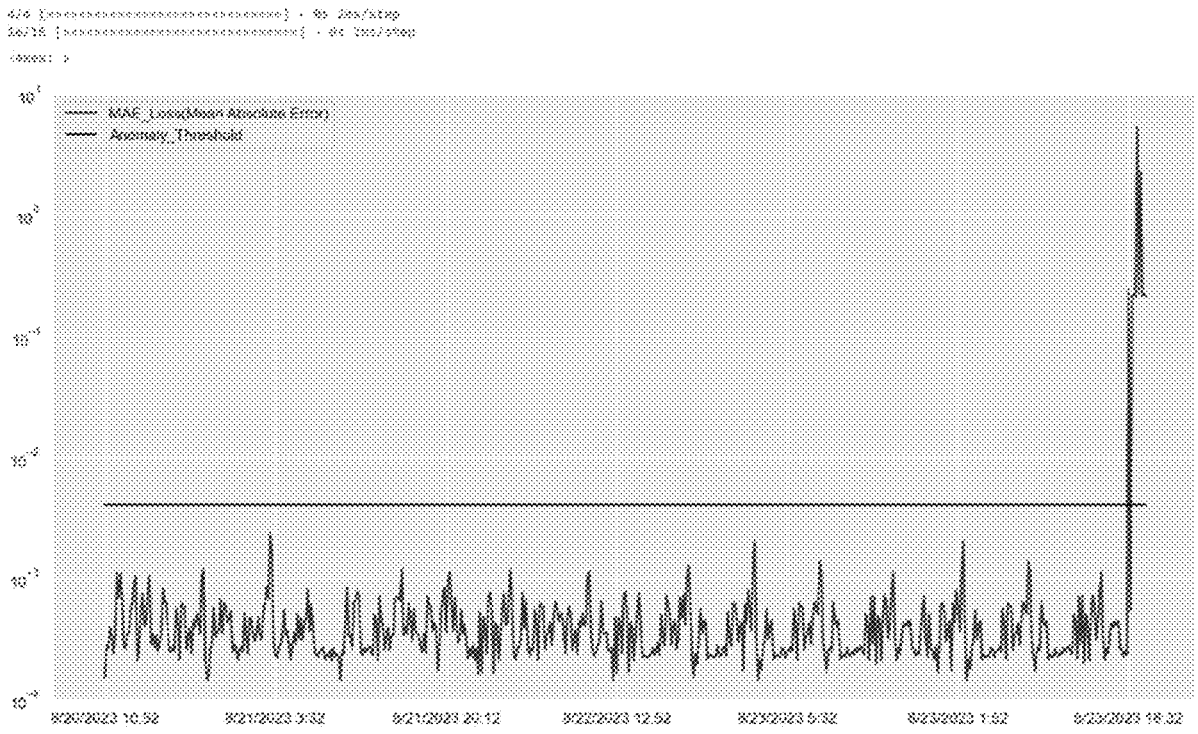

In some embodiments, Mean Absolute Error (MAE) is used for calculating loss in the training dataset by the LSTM autoencoder. FIG. 10 shows pseudocode 1000 for generating a plot 1005 of the distribution of the calculated loss in the training dataset. Based on the distribution, a suitable threshold can be determined for detecting anomalies. Based on the distribution of MAE loss, the threshold for detecting anomalies can be set. In some embodiments, the threshold is set as 0.004, though other values may be set in other embodiments. This will make sure that the threshold set is above existing values of the normal dataset, so anomalies can be triggered above the threshold value. FIG. 11A shows pseudocode 1100 for testing of the LSTM model by passing the erroneous transactions in the test data (e.g., the test_data.csv file) as an input. The test data file has the transactions for which the MAE exceeds the set threshold (e.g., 0.004), which are flagged as anomalies. FIG. 11B shows a plot 1105 illustrating the anomaly threshold and the MAE loss.

Figure 12:
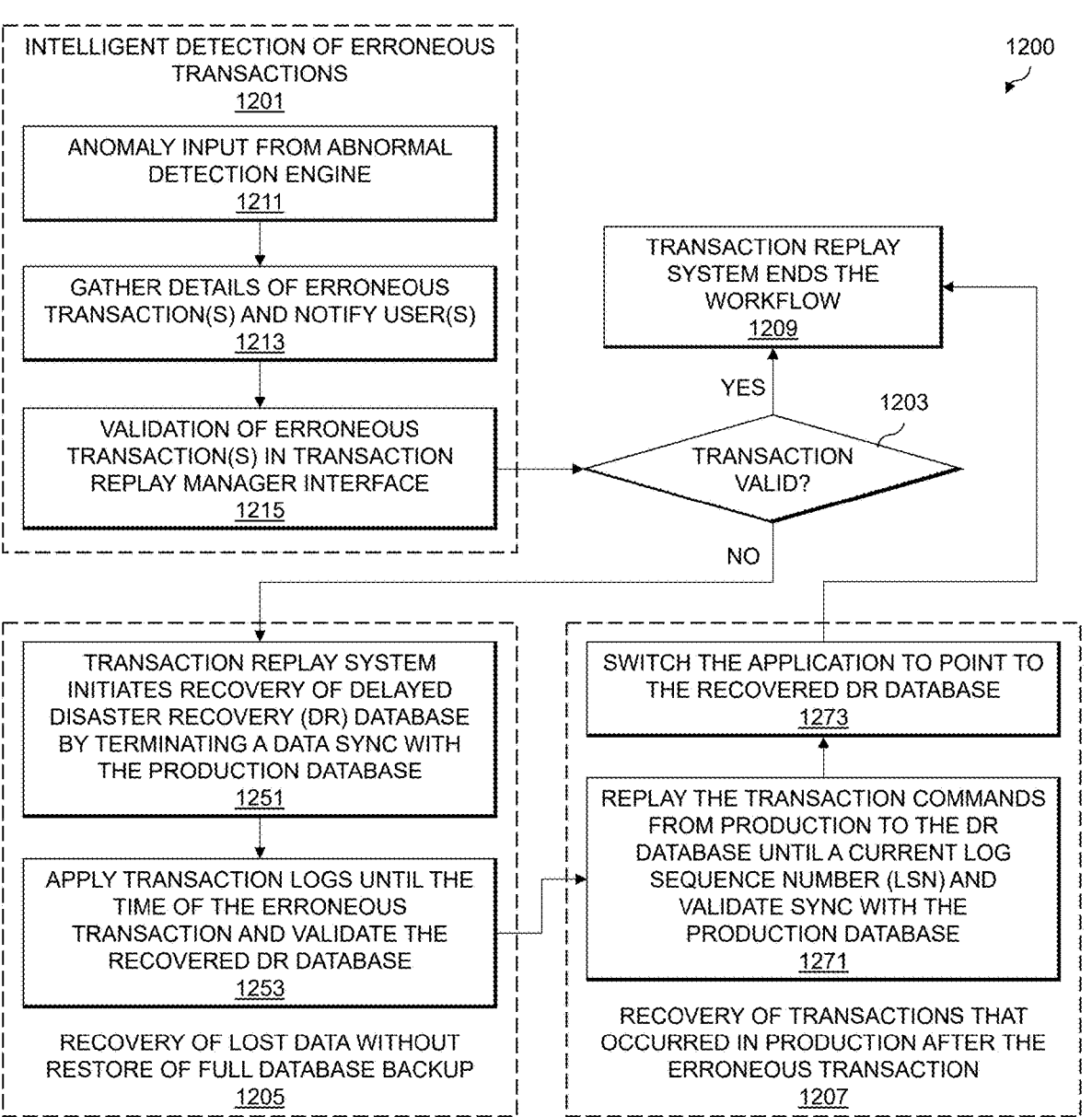
FIG. 12 shows a process flow for database transaction recovery performed by a transaction replay system of a database recovery tool in an illustrative embodiment.

The TRS 513 is configured to initiate the recovery of the delayed DR database 533 to the current state (e.g., of the production database 531) by removing just the erroneous transaction. FIG. 12 shows a process flow 1200 which may be implemented utilizing the TRS 513. The process flow 1200 includes intelligent detection of erroneous transactions 1201, where anomaly input from the ADE 511 is received in block 1211, details of erroneous transactions are gathered and application users 501 are notified in block 1213, and erroneous (e.g., anomalous) transactions are validated by the application users 501 in a UI of the TRS 513 in block 1215. In block 1203, the TRS 513 determines whether a particular anomalous transaction is valid. If the transaction is valid, the TRS ends the workflow in block 1209. If the transaction is not valid, the process flow 1200 proceeds to recovery of lost data without restore of a full database backup 1205, which includes the TRS 513 initiating recovery of the delayed DR database 533 by terminating a data sync with the production database 531 in block 1251, and applying transaction logs until the time of the erroneous transaction and validating the recovered DR database 533 in block 1253. The process flow 1200 then proceeds to recovery of transactions that occurred in production after the erroneous transaction 1207, which includes replaying the transaction commands from production to the DR database 533 until a current LSN and sync with the production database 531 is validated in block 1271. The application is then switched to point to the recovered DR database 533 in block 1273, following the TRS 513 ending the workflow in block 1209.

The ADE 511 identifies anomalies and provides the anomalous transactions as input to the TRS 513. The TRS 513 will inform the application users 501 of the anomalous transactions. In a portal or other UI of the TRS 513, the application users 501 will be able to observe the transaction details. If the application users 501 confirm that the anomalous transaction is in fact erroneous, the TRS 513 will initiate the recovery process of the delayed DR database 533 to the point before the erroneous transaction by applying the transaction logs which are X hours (e.g., where X is the configured DR delay) behind the production database 531.

Once database recovery to the recovery point has been completed, the TRS 513 will compare the LSN of the erroneous transaction to the most recent LSN of the database to affirm that the database has been recovered to the correct recovery point. The TRS 513 will initiate a replay of the most recent production data transactions (e.g., occurring after the erroneous transaction) to the DR database 533. Once the DR database 533 is fully synchronized with the production instance (e.g., the production database 531), the primary database can be migrated to the DR instance (e.g., the DR database 533). The application users 501 will validate the data following the conclusion of the recovery procedures.

An example will now be described with respect to FIGS. 13-15. Whenever an abnormal transaction is detected by the ADE 511, the TRS 513 will retrieve the transaction record details based on the transaction identifier (ID) and notify the application users 501. FIG. 13 shows a table 1300 of the transaction record details, including object name, transaction ID, begin time, end time, account, and numbers of insert, update, delete, truncate and drop object operations. In the table 1300, row 1 represents an anomalous transaction (e.g., with 186 update operations). The TRS 513 provides a portal or UI that allows the application users 501 to observe specific transactions (e.g., the anomalous transaction from row 1 of table 1300). FIG. 14 shows a table 1400 illustrating drill down of records for an anomalous transaction. The table 1400 includes row number, application ID, application reference ID, datum, transaction, previous row number, time, transaction ID, slot ID and LSN columns. Once the application users 501 confirm that an anomalous transaction is in fact erroneous, the TRS 513 will disengage the delayed DR database 533 from the production database 531 and initiate recovery of the delayed DR database 533 to the recovery point based on the LSN prior to the erroneous transaction. The TRS 513 will match the current LSN in the production database 531 with the recovered DR database 533 and reproduce the production transactions in the DR database 533 once the DR database recovery is complete.

The DR database 533 will be fully synchronized with the production database 531 at a certain point. Post data validation, the application can repoint the database connection to the newly restored database. Thus, erroneous transactions can be removed while the data prior to and following the transaction remains intact. The same logic can be used to recover deleted or truncated tables without having to restore the entire database. FIG. 15 shows a table 1500 of transactions in the production database 531 which occurred following the erroneous transaction, and which are replayed to the recovered DR database 533 instance by the TRS 513.

The ADE 511, which may implement an LSTM autoencoder as described above, provides functionality for determining long-term dependencies and sequence prediction in order to detect database transaction anomalies (e.g., DML, DDL) and data corruption. The TRS 513 will intelligently remove erroneous transactions from the database and recover data for transactions executed in the production database 531 after the occurrence of an erroneous transaction. The TRS 513 is thus able to optimize the recovery of data lost as a result of DDL transactions without restoring the entire database backup by recovering the database until the LSN of the erroneous transaction.

Various example use cases will now be described. In one use case, consider an application user that executes a script to remove backup or archive tables in a business intelligence database that has a size of 3 TB. Due to an error in the script, however, all the tables (e.g., around 1200 tables) in a particular schema are deleted. The user realizes the data loss in about 2 hours, and requests the recovery of tables in that schema. The user does not have the details of the tables which were dropped, and is not sure about the transaction time. Thus, it takes the user around 14 hours in total to identify the transaction time, restore the database to a recovery server, and restore tables in the production database. Using the technical solutions described herein, the user will be notified about the discrepancy with script execution (e.g., in real-time or near real-time) and is provided an option to recover the tables with minimal downtime.

In another use case, consider a business user for a configuration application that deletes an order with multiple records from a database accidentally. The issue is identified later, and creates a major incident due to business impact. The application is not aware of the changes, and it takes around 4 hours for the user to identify the issue along with the time of the transaction and details of the deleted records. It takes another 8 hours for the user to recover and validate the data post recovery environment setup, database recovery and copy of data to production. The technical solutions described herein will allow the application users to be notified of the erroneous transaction (e.g., in real-time or near real-time) and recover the data without any or with minimal downtime.

The technical solutions described herein provide various advantages relative to conventional approaches, including removal of erroneous transactions without any data loss, bringing the database up and running in the case of hacking or SQL injection scenarios with minimal data loss, and enabling recovery of databases with minimal downtime (e.g., any size database can be retrieved in as little as 10 minutes in some cases). The technical solutions described herein support various database technologies, including multiple RDBMS technologies. The technical solutions described herein are advantageously able to avoid business impacts and financial loss due to data loss or data unavailability, and avoid database engineer intervention to retrieve the data as application teams can initiate recovery through a portal or other UI of the TRS.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for anomalous transaction recovery in database systems will now be described in greater detail with reference to FIGS. 16 and 17. Although described in the context of system 100, these platforms may also be used to implement at least portions of other information processing systems in other embodiments.

Figure 16:
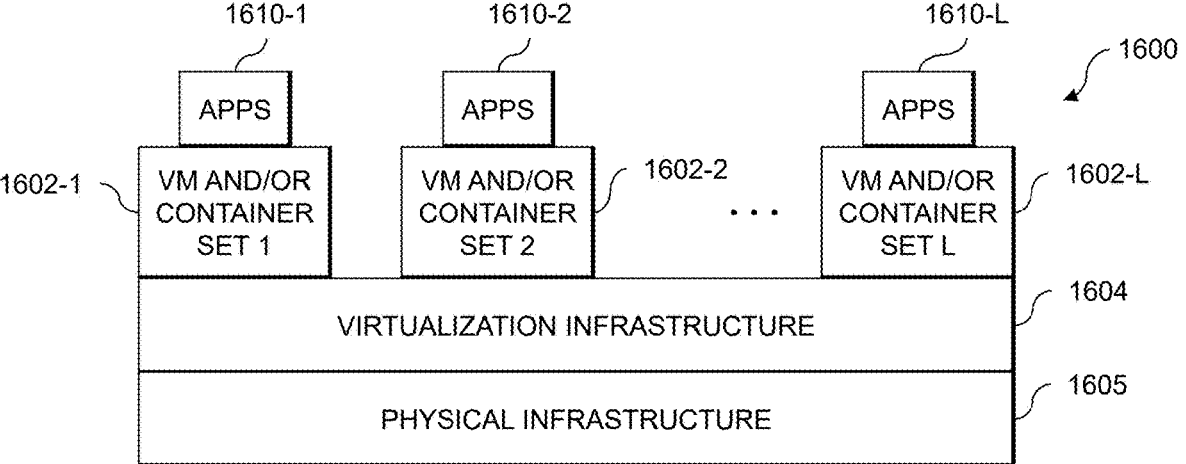
FIGS. 16 and 17 show examples of processing platforms that may be utilized to implement at least a portion of an information processing system in illustrative embodiments.
Figure 17:
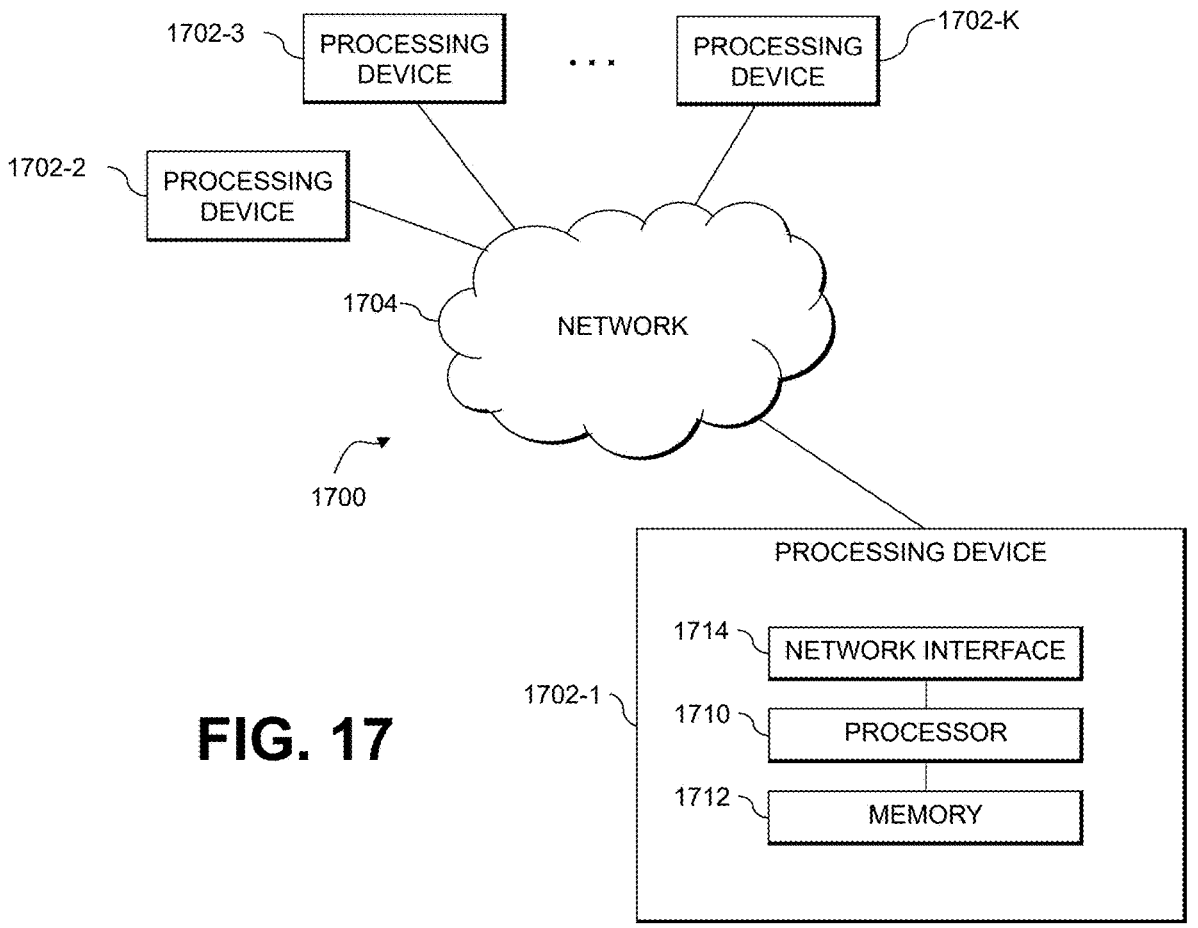

FIG. 16 shows an example processing platform comprising cloud infrastructure 1600. The cloud infrastructure 1600 comprises a combination of physical and virtual processing resources that may be utilized to implement at least a portion of the information processing system 100 in FIG. 1. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for anomalous transaction recovery in database systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to determine an expected distribution of two or more database transaction types that result in deletion of data in a database system, the database system comprising a first database and a second database, the second database having a configurable disaster recovery delay time period relative to the first database;
to train a machine learning model, utilizing the determined expected distribution of the two or more database transaction types that result in deletion of data in the database system, to detect anomalous data deletion transactions in the database system;
to generate time series data characterizing counts of the two or more database transaction types that result in deletion of data in the database system that have occurred in the database system over a given time period;
to detect, utilizing the trained machine learning model that takes as input at least a portion of the generated time series data, a given anomalous data deletion transaction occurring in the database system, the database system;
to determine a recovery time point for the database system, the recovery time point being based at least in part on a transaction time of the given anomalous data deletion transaction;
to replay, from the first database to the second database, a first set of one or more transactions of the database system occurring during the configurable disaster recovery delay time period up to the determined recovery time point;
to validate recovery of the first set of one or more transactions of the database system; and
to replay, from the first database to the second database, a second set of one or more transactions of the database system occurring after the determined recovery time point, responsive to validating recovery of the first set of one or more transactions.

2. The apparatus of claim 1 wherein the machine learning model comprises a Long Short-Term Memory (LSTM) model.

3. The apparatus of claim 1 wherein the machine learning model comprises an autoencoder model.

4. The apparatus of claim 1 wherein the first database comprises a production database in the database system.

5. The apparatus of claim 1 wherein the first database comprises a relational database.

6. The apparatus of claim 1 wherein the time series data is generated based at least in part on event logs generated by the database system.

7. The apparatus of claim 1 wherein the given anomalous data deletion transaction is associated with one or more application users of the database system inadvertently deleting or updating data in the database system.

8. The apparatus of claim 1 wherein the given anomalous data deletion transaction is associated with logical data corruption in the database system caused by one or more scheduled database jobs.

9. The apparatus of claim 1 wherein the given anomalous data deletion transaction is confirmed as an erroneous transaction based at least in part on user input.

10. The apparatus of claim 1 wherein the first and second sets of one or more transactions of the database system are determined utilizing log sequence numbers assigned to transactions of the database system.

11. The apparatus of claim 1 wherein the at least one processing device is further configured, prior to replay of the first set of one or more transactions of the database system from the first database to the second database, to terminate a data synchronization between the first database and the second database.

12. The apparatus of claim 1 wherein the at least one processing device is further configured to validate recovery of the second set of one or more transactions of the database system.

13. The apparatus of claim 12 wherein the at least one processing device is further configured, responsive to validating recovery of the second set of one or more transactions of the database system, to set the second database as a primary database of the database system.

14. The apparatus of claim 1 wherein the given anomalous data deletion transaction comprises at least one of:
a data manipulation language update or delete command; and
a data definition language truncate or drop command.

15. A computer program product comprising a non-transitory processor-readable storage medium having stored therein program code of one or more software programs, wherein the program code when executed by at least one processing device causes the at least one processing device:
to determine an expected distribution of two or more database transaction types that result in deletion of data in a database system, the database system comprising a first database and a second database, the second database having a configurable disaster recovery delay time period relative to the first database;
to train a machine learning model, utilizing the determined expected distribution of the two or more database transaction types that result in deletion of data in the database system, to detect anomalous data deletion transactions in the database system;
to generate time series data characterizing counts of the two or more database transaction types that result in deletion of data in the database system that have occurred in the database system over a given time period;

to detect, utilizing the trained machine learning model that takes as input at least a portion of the generated time series data, a given anomalous data deletion transaction occurring in the database system;

to determine a recovery time point for the database system, the recovery time point being based at least in part on a transaction time of the given anomalous data deletion transaction;

to replay, from the first database to the second database, a first set of one or more transactions of the database system occurring during the configurable disaster recovery delay time period up to the determined recovery time point;

to validate recovery of the first set of one or more transactions of the database system; and to replay, from the first database to the second database, a second set of one or more transactions of the database system occurring after the determined recovery time point, responsive to validating recovery of the first set of one or more transactions.

16. The computer program product of claim 15 wherein the machine learning model comprises a Long Short-Term Memory (LSTM) autoencoder model.

17. The computer program product of claim 15 wherein the first and second sets of one or more transactions of the database system are determined utilizing log sequence numbers assigned to transactions of the database system.

18. A method comprising:

determining an expected distribution of two or more database transaction types that result in deletion of data in a database system, the database system comprising a first database and a second database, the second database having a configurable disaster recovery delay time period relative to the first database;

training a machine learning model, utilizing the determined expected distribution of the two or more database transaction types that result in deletion of data in the database system, to detect anomalous data deletion transactions in the database system;

generating time series data characterizing counts of the two or more database transaction types that result in deletion of data in the database system that have occurred in the database system over a given time period;

detecting, utilizing the trained machine learning model that takes as input at least a portion of the generated time series data, a given anomalous data deletion transaction occurring in the database system;

determining a recovery time point for the database system, the recovery time point being based at least in part on a transaction time of the given anomalous data deletion transaction;

replaying, from the first database to the second database, a first set of one or more transactions of the database system occurring during the configurable disaster recovery delay time period up to the determined recovery time point;

validating recovery of the first set of one or more transactions of the database system; and replaying, from the first database to the second database, a second set of one or more transactions of the database system occurring after the determined recovery time point, responsive to validating recovery of the first set of one or more transactions;

wherein the method is performed by at least one processing device comprising a processor coupled to a memory.

19. The method of claim 18 wherein the machine learning model comprises a Long Short-Term Memory (LSTM) autoencoder model.

20. The method of claim 18 wherein the first and second sets of one or more transactions of the database system are determined utilizing log sequence numbers assigned to transactions of the database system.

\* \* \* \* \*